United States Patent
Zhang et al.

(10) Patent No.: US 6,465,981 B2
(45) Date of Patent: Oct. 15, 2002

(54) ADAPTIVE ANTI-WINDUP METHOD AND APPARATUS FOR DISC DRIVE SERVO CONTROL

(75) Inventors: Tao Zhang, Kingston (CA); Qiang Bi; Kevin A. Gomez, both of Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/861,794

(22) Filed: May 21, 2001

(65) Prior Publication Data

US 2002/0060540 A1 May 23, 2002

Related U.S. Application Data

(60) Provisional application No. 60/235,591, filed on Sep. 27, 2000.

(51) Int. Cl.[7] .............................. G05B 11/01
(52) U.S. Cl. .................. 318/560; 318/560; 318/561; 318/609; 318/610; 318/690; 360/78.04; 360/78.05; 360/78.07; 360/78.09; 364/148.1; 364/153; 364/157; 700/90; 700/245; 702/186
(58) Field of Search .................. 318/560, 609, 318/610, 690, 561; 360/78.07, 78.09, 78.05, 78.04; 702/186; 364/148.1, 153, 157; 700/90, 245

(56) References Cited

U.S. PATENT DOCUMENTS

| | | | |
|---|---|---|---|
| 3,566,241 A | 2/1971 | Ross | 318/624 |
| 3,582,629 A | 6/1971 | Ross | 235/151.1 |
| 3,938,017 A | 2/1976 | Hayes | 318/610 |
| 4,268,784 A | 5/1981 | Ganaway | 318/610 |
| 4,303,873 A | 12/1981 | Hawkins | 318/301 |
| 4,806,836 A | 2/1989 | Webb | 318/609 |
| 4,872,104 A | 10/1989 | Holsinger | 364/166 |
| 5,233,482 A * | 8/1993 | Galbraith et al. | 360/46 |
| 5,298,845 A | 3/1994 | DeBoer et al. | 318/609 |
| 5,426,545 A | 6/1995 | Sidman et al. | 360/78.09 |
| 5,570,282 A | 10/1996 | Hansen et al. | 364/148 |
| 5,699,334 A * | 12/1997 | Yamada et al. | 369/44.32 |
| 5,768,226 A * | 6/1998 | Ogino | 369/44.36 |
| 5,978,752 A * | 11/1999 | Morris | 702/186 |
| 5,980,080 A | 11/1999 | Loparo et al. | 364/148.1 |
| 6,060,854 A | 5/2000 | Yutkowitz | 318/632 |
| 6,097,564 A * | 8/2000 | Hunter | 360/78.04 |
| 6,101,058 A * | 8/2000 | Morris | 360/69 |
| 6,088,187 A * | 11/2000 | Takaishi | 360/78.05 |
| 6,088,188 A * | 11/2000 | Serrano et al. | 360/78.09 |
| 6,188,531 B1 * | 2/2001 | Chang et al. | 360/46 |
| 6,268,984 B1 * | 7/2001 | Boutaghou | 360/294.5 |
| 6,292,320 B1 * | 9/2001 | Mason et al. | 360/63 |

* cited by examiner

Primary Examiner—Robert E. Nappi
(74) Attorney, Agent, or Firm—Westman, Champlin & Kelly (57) ABSTRACT

A method and apparatus are provided for positioning a head over a disc in a disc drive while maintaining servo loop stability. The apparatus includes an actuator-head assembly having a large-scale actuator and a micro-actuator that are both able to move the head over the disc. A saturation adjustment component detects when a micro-actuator controller is producing a micro-actuator control value that will saturate the micro-actuator. Using the micro-actuator control value, the saturation adjustment component generates a saturation error value. An adaptive anti-windup circuit transfers control to the large-scale actuator when the saturation error value is generated by the saturation adjustment component.

24 Claims, 7 Drawing Sheets

ADAPTIVE ANTI-WINDUP METHOD AND APPARATUS FOR DISC DRIVE SERVO CONTROL

CROSS-REFERENCE TO RELATED APPLICATION

The present application claims priority to U.S. Provisional Application Serial No. 60/235,591, filed Sep. 27, 2000 and entitled "AN ADAPTIVE ANTI-WINDUP METHOD FOR DISC DRIVE DUAL-STAGE SERVO CONTROL".

FIELD OF THE INVENTION

The present invention is related to disc drives. In particular, the present invention is related to disc drive servo control systems.

BACKGROUND OF THE INVENTION

In a computer disc drive, data is stored on discs in concentric tracks. In disc drives with relatively high track densities, a servo feedback loop is used to maintain a head over the desired track during read or write operations. This is accomplished utilizing prerecorded servo information either on a dedicated servo disc or on sectors that are interspersed along a disc. During track following, the servo information sensed by the head is demodulated to generate a position error signal (PES) which provides an indication of the distance between the head and the track center. The PES is then converted into an actuator control signal, which is used to control an actuator that positions the head.

Historically, only one actuator, typically a voice coil motor (VCM), was used to position the head. Recently, micro-actuators have been proposed that would be used in combination with the VCM to position the head. Because they are small, such micro-actuators generally have a better frequency response than the VCM. As such, they are better able to follow high frequency control signals.

Although the micro-actuators have a better frequency response than voice coil motors, they also have a more limited range of motion. When a micro-actuator reaches the limit of its range of motion, increases in the control signal to the micro-actuator do not result in any more movement of the micro-actuator. Under these conditions, micro-actuator is said to be saturated.

When a micro-actuator saturates in a servo loop, it causes two problems. First, because the stability of the servo loop is designed based on the inclusion of a responsive micro-actuator, when the micro-actuator saturates, it can cause the entire servo loop to become unstable. Second, the actuator controller corresponding to the micro-actuator typically includes some form of past state feedback. When the micro-actuator is unable to move to the position set by the controller, the past state stored in the controller is no longer tied to the movement of the head. This discrepancy in the past states affects the performance of the controller even after the input to the controller drops below a value that would cause the micro-actuator to saturate. The errors caused by past state discrepancy are known as windup.

Several techniques have been used in control system design to avoid instability and windup resulting from actuator saturation. However, most of these schemes are designed for single-loop systems, which are not directly applicable to dual-stage anti-windup control systems. One technique applicable to dual actuator disc drive servo systems utilizes the micro-actuator feedback signal to avoid destabilization. This technique is complex and hinders tracking performance of the servo loop.

The present invention addresses these problems and offers other advantages over the prior art.

SUMMARY OF THE INVENTION

The present embodiments relate to servo systems that employ an adaptive anti-windup scheme that adjusts the gain of the VCM and micro-actuator controllers to avoid micro-actuator saturation under external vibration disturbances, thereby addressing the above-mentioned problems.

One embodiment relates to an apparatus for positioning a head over a disc in a disc drive while maintaining servo loop stability. The apparatus includes an actuator-head assembly having a large-scale actuator and a micro-actuator that are both able to move the head over the disc. A saturation adjustment component detects when a micro-actuator controller is producing a micro-actuator control value that will saturate the micro-actuator. Using the micro-actuator control value, the saturation adjustment component generates a saturation error value. An adaptive anti-windup circuit transfers control to the large-scale actuator when the saturation error value is generated by the saturation adjustment component.

Another embodiment relates to a method of maintaining stability in a servo loop of a disc drive that has a large-scale actuator, a micro-actuator, a head, and a disc. The method includes generating a position value based on the position of the head over the disc and generating a micro-actuator control value for driving the micro-actuator based on a position error value. A saturation error value is generated based on the amount by which the micro-actuator control value exceeds a threshold saturation value. Control is transferred to the large-scale actuator when the saturation error value is generated.

These and various other features as well as advantages which characterize the present invention will be apparent upon reading of the following detailed description and review of the associated drawings.

BRIEF DESCRIPTION OF THE DRAWINGS

FIG. 4-1 illustrates the saturation function of the micro-actuator due to limited stroke.

FIG. 4-2 illustrates the saturation function of the saturation operator of FIG. 3 with a threshold saturation value that is a fraction of the maximum saturation of the micro-actuator.

FIGS. 5-1 and 5-2 are graphs of the frequency responses of the transfer functions of servo circuits within the servo loop.

FIGS. 6-1 to 6-3 illustrate comparisons between tracking performance without and with the anti-windup technique of the present invention.

FIG. 7 illustrates a simplified technique of implementing the VCM controllers of FIG. 3.

DETAILED DESCRIPTION OF ILLUSTRATIVE EMBODIMENTS

Figure 1:
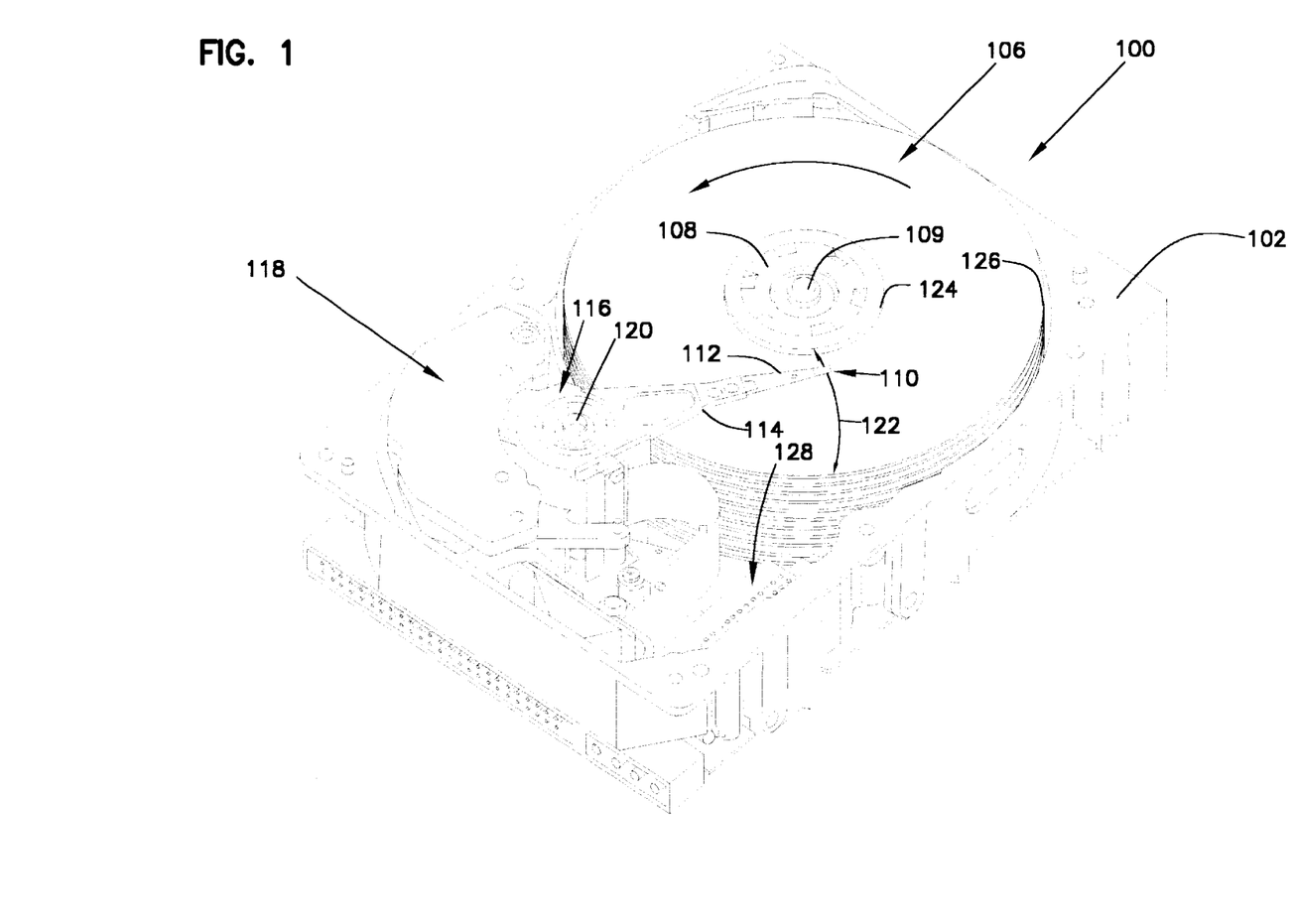
FIG. 1 is a perspective view of a disc drive in which aspects of the present invention may be practiced.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 106. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics 128 based on signals generated by heads 110 and a host computer (not shown).

Figure 2:
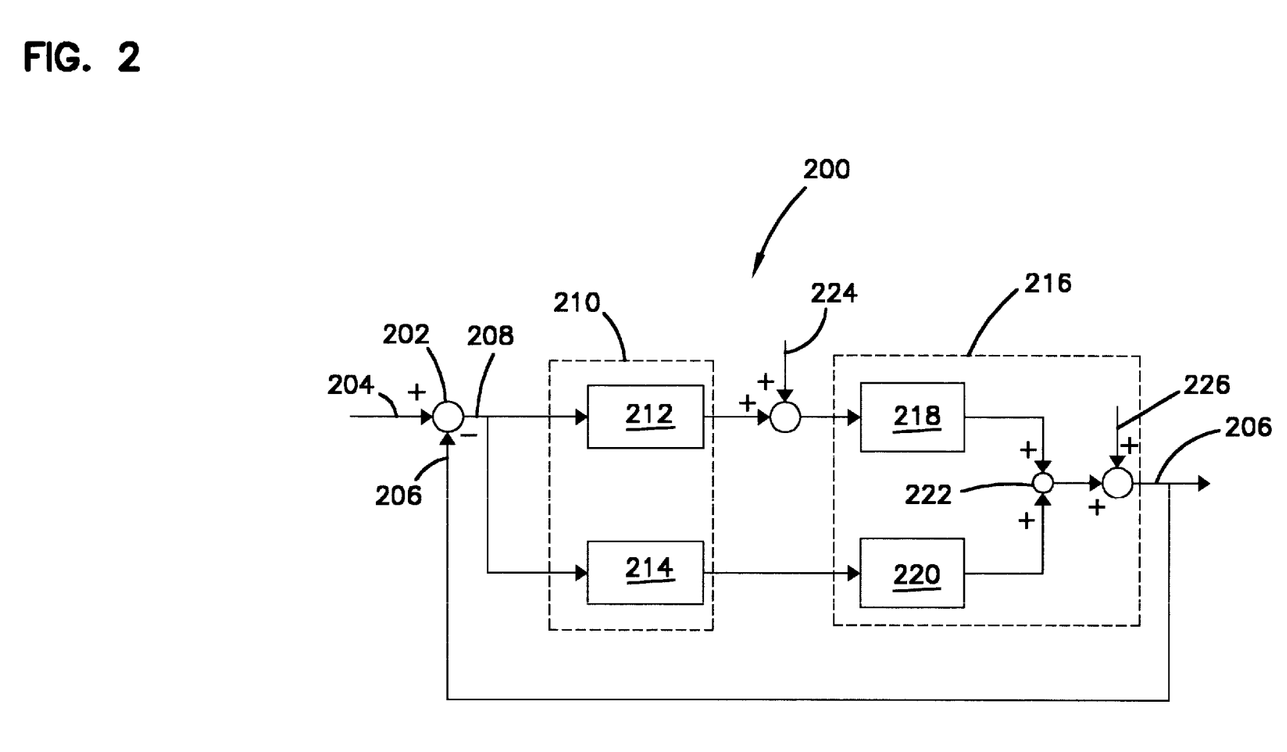
FIG. 2 is a block diagram of a servo loop of the prior art.

Referring now to FIG. 2, a block diagram of a servo loop 200 that is found in servo electronics 128 (shown in FIG. 1) of the prior art is shown. Because precise structure of the servo loop is not significant to the present invention, servo loop 200 is shown in a simplified form. Those skilled in the art will appreciate that servo loops are more complex than the simple diagram of FIG. 2.

In FIG. 2, servo loop 200 includes a summing node 202 that receives a reference signal 204 indicating the desired position for a head on the disc. Summing node 202 combines reference signal 204 with a position value 206, described below, to produce a position error signal 208 that is provided to a digital controller 210. Digital controller 210 includes a VCM controller 212 and a micro-actuator controller 214 that each receive position error signal 208. Based on position error signal 208, VCM controller 212 generates a digital control value that is provided to a VCM 218 in an actuator head assembly 216. Similarly, micro-actuator controller 214 generates a digital control value that is provided to a micro-actuator 220 in actuator head assembly 216.

The control values cause VCM 218 and micro-actuator 220 to move, thereby changing the position of the head over the disc. Specifically, the movement of the head is the sum of the head movement caused by the VCM and the head movement caused by the micro-actuator. This summing effect is represented by summing node 222 in FIG. 2. Disturbances in servo loop 200 are shown by torque disturbance 224 (including windage, rotational vibration, etc.), and head position disturbances 226 (including written-in-error, measurement noises, disc motion, etc.).

Using servo patterns stored on the disc, the head generates an analog signal that indicates the distance from the head to the track center. The analog signal is converted into a digital signal 206 within assembly 216 and digital signal 206 is fed back to summing node 202. Summing node 202 then subtracts digital signal 206 from reference signal 204 to produce position error signal 208.

In dual-stage servo design, VCM controller 212 and micro-actuator controller 214 are usually designed without considering any saturation of micro-actuator output. In general, the output of micro-actuator controller 214 is small during track following when there is no external rotational vibration (RV). However, when there is RV disturbance (usually located in 10–300 Hz range) a large control signal may be generated by micro-actuator controller 214. This may cause micro-actuator 220 to go into saturation because the stroke of the piezo-electric crystal used for micro-actuator 220 is limited. Hence, the output of micro-actuator 220 may be saturated when a large micro-actuator control signal is applied. When micro-actuator 220 is under saturation the servo loop 200 becomes highly non-linear. In dual-stage servo design, in order to provide enough attenuation at low frequency to handle rotational vibration disturbances, the VCM loop (VCM servo circuit) is normally designed as an unstable loop. Thus, the micro-actuator loop (micro-actuator servo circuit) is critical for stabilizing the closed-loop system. Once the output of micro-actuator 220 goes into saturation, the dual-stage system will be unstable. This condition is often referred to as windup.

The present invention addresses this windup problem by modifying the gains of the micro-actuator controller and the VCM controller such that micro-actuator 220 is not driven into saturation even during disturbance events such as RV. The adaptive anti-windup design of the present invention achieves high tracking performance when micro-actuator 220 is not saturated, and maintains acceptable tracking performance when the output of the micro-actuator controller exceeds saturation level under RV disturbances. An adaptive tuning algorithm automatically adjusts the relative loop gains of servo circuits (micro-actuator and VCM servo circuits) such that the micro-actuator servo circuit contains few low frequency components and thereby avoids saturation in a RV environment.

Figure 3:
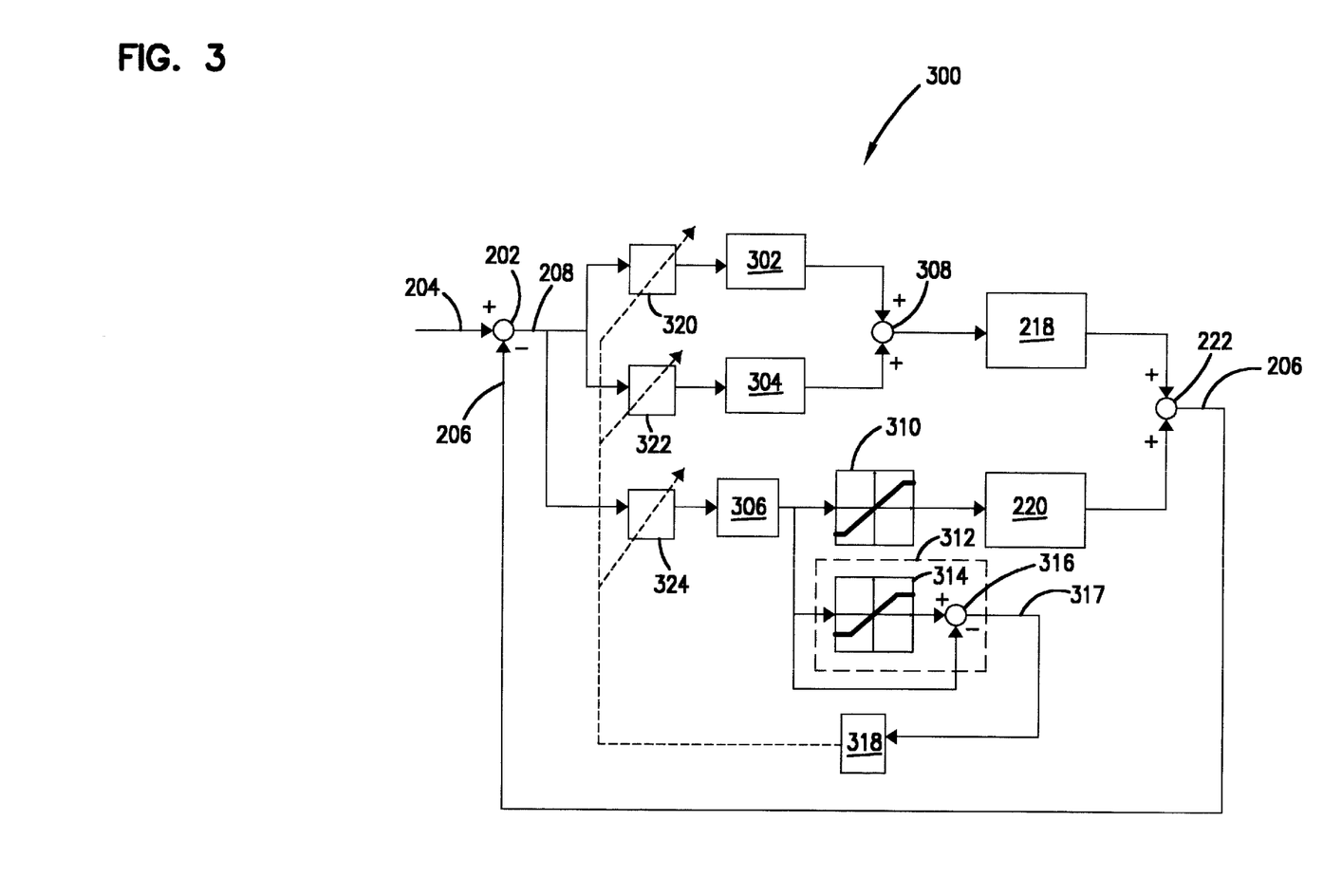
FIG. 3 is a block diagram of a servo loop with anti-windup compensation of the present invention.

Referring now to FIG. 3, a block diagram of servo loop 300 with anti-windup compensation of the present invention is shown. Servo loop 300 employs first VCM controller 302 and second VCM controller 304 for VCM 218. The outputs of controllers 302 and 304 are combined at summing node 308 and fed to VCM 218. A single controller 306 operates micro-actuator 220. Block 310 shows the saturation function (S1) of micro-actuator 220 due to limited stroke. Saturation adjustment component 312 generates a saturation error value 317 based on the amount by which a control value produced by micro-actuator controller 306 exceeds a threshold saturation value. The threshold saturation value is monitored by saturation operator (S2) illustrated in block 314.

Figure 41:
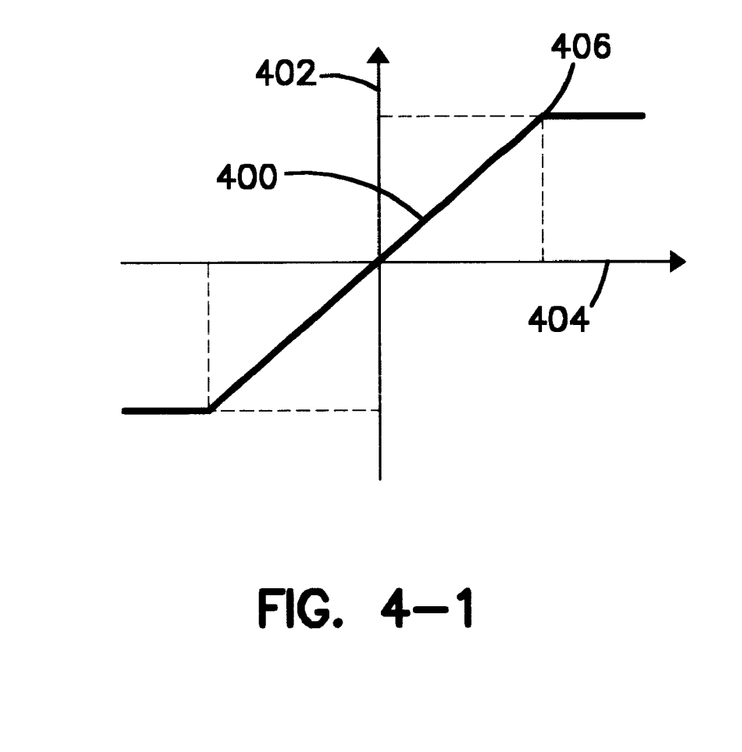
Figure 42:
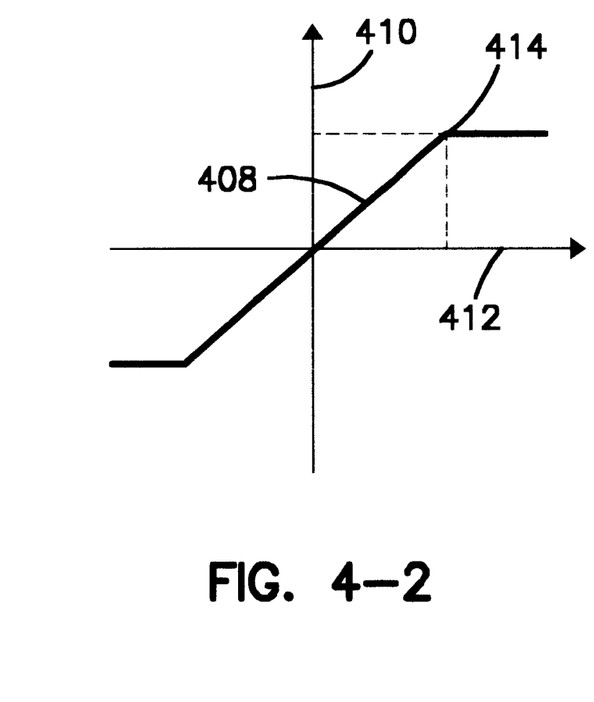

Details of blocks 310 and 314 (S1 and S2) are shown in FIGS. 4-1 and 4-2. FIG. 4-1 shows a plot 400 of the output, $U_{out}$, of micro-actuator 220 along vertical axis 402 as a function of input, $U_{in}$, along horizontal axis 404. $U_{max}$ (point 406 in FIG. 4-1) is the positive saturation value at which the micro-actuator saturates. FIG. 4-2 illustrates a plot 408 of the output of saturation operator S2 along vertical axis 410 as a function of input along horizontal axis 412. Point 414 in FIG. 4-2 is the threshold saturation value of saturation operator S2 that is typically a fraction of $U_{max}$ (for example, ($\frac{2}{3}$) ($U_{max}$)). This design ensures that micro-actuator 220 is not driven into saturation.

In FIG. 3, difference node 316 receives the micro actuator control value form controller 306 and a saturation control value from S2 (block 314) and outputs saturation error value 317. Saturation error value 317 is fed to adaptive gain component 318 which adjusts a control gain associated with each servo circuit. Individual control gain elements K1, K2 and K3 are shown as blocks 320, 322 and 324. The present system avoids instability resulting from micro-actuator saturation by modifying the gains K1, K2 and K3 of the VCM and micro-actuator controllers.

Servo loop 300 of the present invention includes three servo circuits; a first servo circuit which includes controller 302 and VCM 218, a second servo circuit that includes controller 304 and VCM 218, and a third servo circuit that includes controller 306 and micro-actuator 220. EQ. 1 below defines the transfer functions of the three servo circuits.

EQ. 1

$$Lvcm\_C1 = C1 \cdot Gvcm$$

$$Lvcm\_C2 = C2 \cdot Gvcm$$

$$Lpzt = C3 \cdot Gpzt$$

Lvcm_C1, the transfer function of the first servo circuit, is a product of the transfer function, C1, of controller 302 and transfer function, Gvcm, of VCM 218. Lvcm_C2, the transfer function of the second servo circuit, is a product of the transfer function, C2, of controller 304 and Gvcm. Lpzt, the transfer function of the third servo circuit, is a product of the transfer function, C3, of controller 306 and gain, Gpzt, of micro-actuator 220.

For simplification, transfer functions C1, C2 and C3 will hereinafter be used to represent controllers 302, 304 and 306. Also, the three servo circuits will hereinafter be represented by transfer functions Lvcm_C1, Lvcm_C2 and Lvcm_C3.

When saturation of micro-actuator 220 is not considered, C2 and C3 represent nominal controllers such that the combined dual-stage loop Lvcm_C2+Lpzt has the best tracking performance with high bandwidth (BW), suitable gain margin (GM) and phase margin (PM). C1 is designed for anti-windup purposes. Since RV disturbances of desktop drives are mainly located within 10–300 Hz range, if the relative gain of Lpzt (K3) is reduced within this frequency range by increasing the gain of Lvcm_C1 (K1) and/or Lvcm_C2 (K2), then VCM 218 will take over most of the job of rejecting the RV disturbances. Thus, micro-actuator 220 will not respond to low frequency RV disturbance. A loop-shaping technique, described below, is used to develop controller C1 with a high gain within the frequency range of 0–600 Hz.

Figure 51:
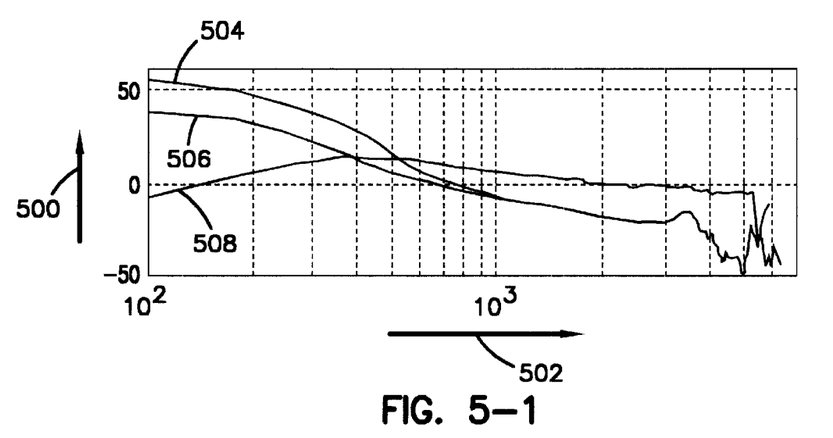
Figure 52:
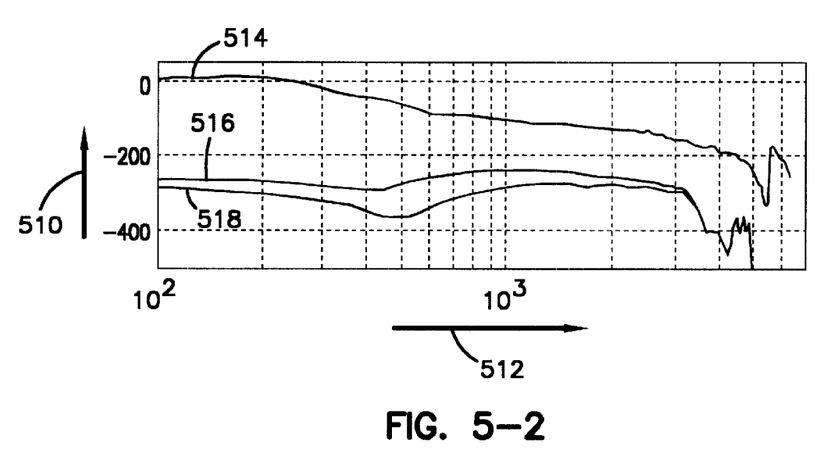

Referring now to FIGS. 5-1 and 5-2, frequency response plots for Lvcm_C1, Lvcm_C2 and Lpzt are shown. FIG. 5-1 shows plots of gain variation in dB along vertical axis 500 as a function of frequency in Hz along horizontal axis 502. Plot 504, the variation of gain for Lvcm_C1, shows a substantially greater gain in the 0–600 Hz frequency range than plot 508 which is the variation of gain for Lpzt. Plot 506, the variation of gain for Lvcm_C2 shows a gain that is in between that of Lvcm_C1 and Lpzt in the frequency range of 0–600 Hz. FIG. 5-2 illustrates the variation of phase in degrees along vertical axis 510 as a function of frequency in Hz along horizontal axis 512. Plots 514, 516 and 518 illustrate the variation of phase for Lpzt, Lvcm_C2 and Lvcm_C1 respectively.

The low frequency gain, dual-loop BW, GM and PM of VCM 218 is adjusted by tuning K1, K2 and K3 (320, 322 and 324 of FIG. 3). For example, when the output of micro-actuator 220 exceeds a certain limit, the dual servo loop will switch to K1=1, K2=0 (i.e., the open loop becomes Lvcm_C1+Lpzt). After the switch occurs, the output of micro-actuator 220 contains very few low frequency components, thereby reducing its amplitude and causing it to leave saturation mode. However, due to the fast phase loss of Lvcm_C1 (plot 518 of FIG. 5-2), the dual servo loop phase margin will decrease, resulting in deterioration of the tracking performance. To maintain enough phase margin, Lpzt gain (K3) can be slightly reduced. An illustrative example of different BW, GM and PM under different gains K1, K2 and K3 is shown in Table 1.

TABLE 1

| | BW | GM | PM |
|---|---|---|---|
| K1 = 0, K2 = 1, K3 = 1 | 1800 Hz | 6 dB | 40 degrees |
| K1 = 1, K2 = 0, K3 = 1 | 1780 Hz | 6.2 dB | 30 degrees |
| K1 = 1, K2 = 0, K3 = 0.95 | 1700 Hz | 6.5 dB | 38 degrees |

The tuning of K1, K2 and K3 is critical for a successful loop shaping. The present invention utilizes an adaptive tuning algorithm to automatically adjust three servo loops under different operating conditions.

The adaptive tuning algorithm is created based on the following guidelines: (1) keeping nominal design (i.e., K1=0, K2=1 and K3=1) when micro-actuator 220 is not saturated; (2) smoothly adjusting K1 and K2 when micro-actuator 220 is approaching saturation; and (3) maintaining suitable BW, GM, PM for achieving acceptable tracking performance by tuning K3.

The adaptive tuning algorithm used for on-line tuning is as follows:

EQ. 2

$$K1(t) = \beta \cdot b_1(t)$$

$$K2(t) = 1 - \beta b_1(t)$$

$$K3(t) = 1 - \gamma b_1(t)$$

Where $0 < \beta < 1$, $0 < \gamma < 1$, and $b_1(t)$ is defined by $$b_1(t) = \begin{cases} b(t), & \text{if } b(t) < 1 \\ 1, & \text{otherwise} \end{cases} \quad \text{EQ. 3}$$

and b(t) in EQ. 3 is defined by

EQ. 4

$$b(t) = g_1 \cdot b(t-1) + g_2 \cdot (1 + |PES|) \cdot |Epzt|, \text{ with } b(0) = 0$$

where $0 < g_1 < 1$ and $g_2 > 0$ and Epzt is saturation error value 317 (of FIG. 3). It is clear that $b(t) \geq 0, \forall t > 0$.

From EQ. 4 it follows that when the micro-actuator is close to saturation (i.e., |Epzt|>0), b(t) will be larger than 0, loop gain K1 will increase and K2 will drop. The overall VCM low frequency loop gain will increase. When Epzt=0 (i.e., the micro-actuator is out of saturation), b(t) will decrease to zero, and make the servo loop return to the nominal design.

In order to guarantee the stability of the closed loop adaptive system of the present invention, the following rules are used in the choice of parameters for the adaptive tuning algorithm of EQS. 2, 3 and 4:

1) β and γ are chosen such that the following loop is stable

EQ. 5

$$G1 = \frac{\beta \cdot Lvcm\_C1 + (1-\beta) \cdot Lpzt\_C2 + (1-\gamma) \cdot Lpzt}{1 + \beta \cdot Lvcm\_C1 + (1-\beta) \cdot Lpzt\_C2 + (1-\gamma) \cdot Lpzt} \quad \text{EQ. 5}$$

where G1 is the gain of the servo loop under a maximum saturation condition (i.e., $b_1(t)=1$ in EQS. 2 and 3).

2) γ is chosen such that the servo loop described by EQ. 6 below has enough phase margin and suitable gain margin.

$$G2 = \frac{K1 \cdot \text{Lcvm\_C1} + K2 \cdot \text{Lvcm\_C2} + K3 \cdot Lpzt}{1 + K1 \cdot \text{Lvcm\_C1} + K2 \cdot \text{Lvcm\_C2} + K3 \cdot Lpzt} \quad \text{EQ. 6}$$

where G2 is the gain of the servo loop under less than maximum saturation conditions (i.e., 0<b(t)<1 in EQS. 3 and 4).

3) Parameters $g_1$ and $g_2$ affect the learning speed of the adaptive law. For example, large $g_2$ implies that fast adaptation is implemented and small $g_1$ can make b(t) go to zero rapidly when the micro-actuator is out of saturation.

To investigate suitable values of $g_1$ and $g_2$, and the dynamic range of b(t), the adaptive tuning algorithm is analyzed using the Lyapunov stability technique. In accordance with this technique, an error signal e(t) is defined in EQ. 7 below.

EQ. 7

$$e(t) = (1+|PES|)|Epzt|$$

Also, $\Delta V(t)$ which is the difference between V(t+1) and V(t) of a positive function $V(t)=b^2(t)$ is calculated in EQ. 8 below.

$$\begin{aligned}
\Delta V(t) &= b^2(t+1) - b^2(t) \quad \text{EQ. 8}\\
&= [b(t+1) - b(t)][b(t+1) - b(t)]\\
&= [-(1-g_1)b(t) + g_2 e(t)][(1+g_1)b(t) + g_2 e(t)]\\
&= -(1-g_1^2)b^2(t) + 2g_1 g_2 b(t)e(t) + g_2^2 e^2(t)\\
&= -(1-g_1^2)\left[b^2(t) - \frac{g_1 g_2}{1-g_1^2}b(t)e(t) - \frac{g_2^2}{1-g_1^2}e^2(t)\right]\\
&= -(1-g_1^2)\left\{\left[b(t) - \frac{g_1 g_2}{1-g_1^2}e(t)\right]^2 - \frac{g_2^2}{(1-g_1^2)^2}e^2(t)\right\}
\end{aligned}$$

From EQ. 8 it follows that when $$b(t) > \frac{g_2}{1-g_1}e(t), \quad \text{EQ. 9}$$

$\Delta V(t)<0$, i.e., b(t+1)<b(t). This means that b(t) has an upper limit which depends on parameters $g_1$ and $g_2$, and error signal e(t). As a result of the dual-loop design and the choice of β and γ, PES, Epzt and e(t) are bounded. This proves the b(t) is also bounded.

In a practical implementation of the adaptive tuning algorithm, $g_1$ and $g_2$ satisfy the following relationship.

$$\frac{g_2}{1-g_1}e_{\max} = 1, \quad \text{EQ. 10}$$

where $e_{max}$ is the upper bound of e(t).

Table 2 below includes parameter values used for an implementation of the anti-windup scheme of the present invention. The disc drive used employs a micro-actuator having a driver with a power supply of +/−5V. The saturation voltage is set to +/−4.5V.

TABLE 2

| Parameter | β | γ | g1 | g2 |
|---|---|---|---|---|
| Value | 0.95 | 0.1 | 0.2 | 0.8 |

Figure 61:
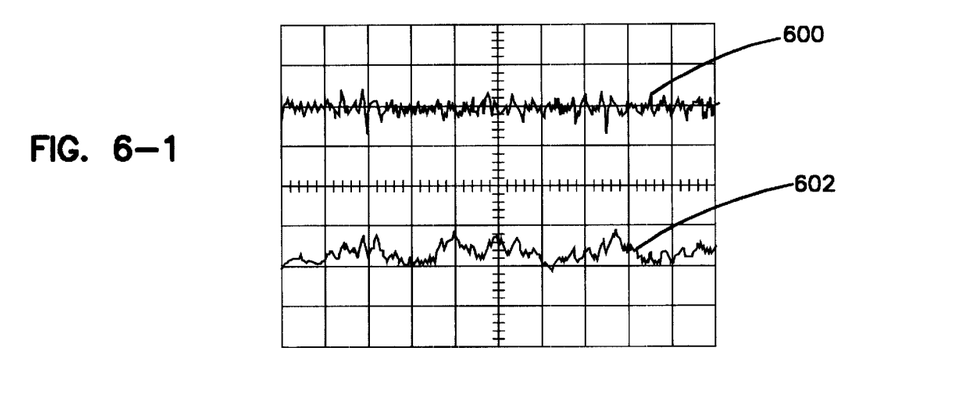
Figure 62:
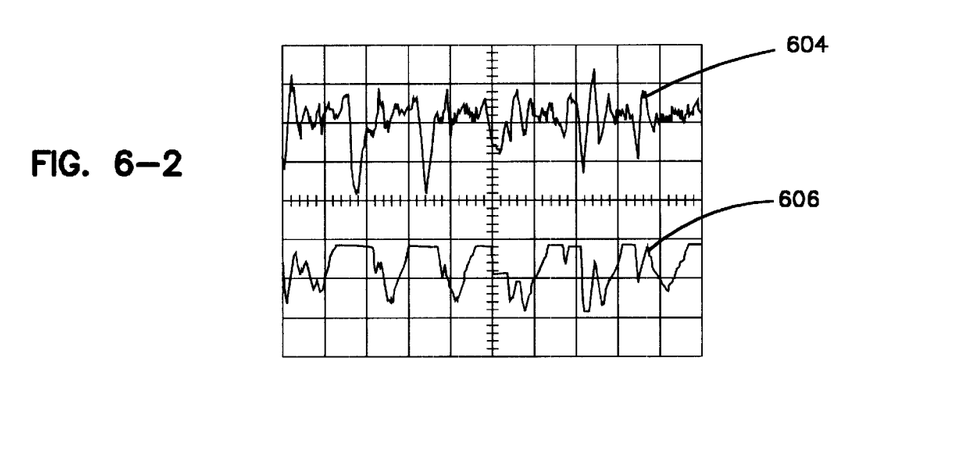
Figure 63:
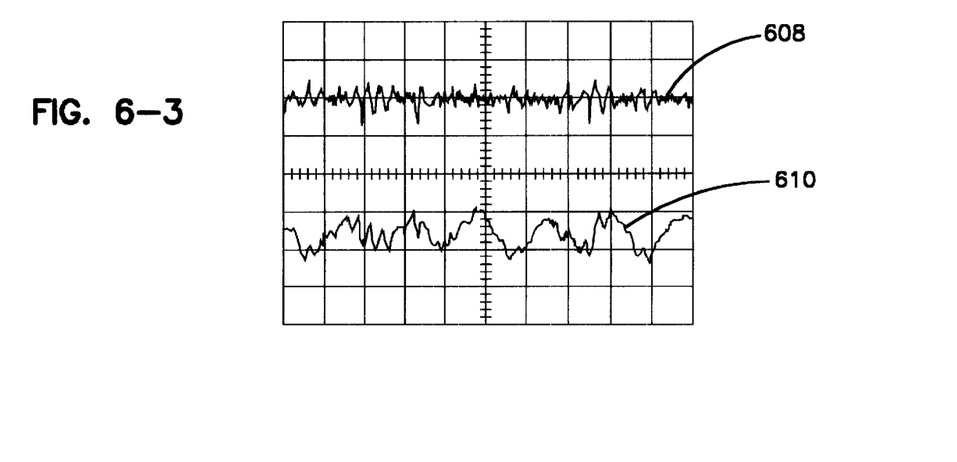
Figure 71:
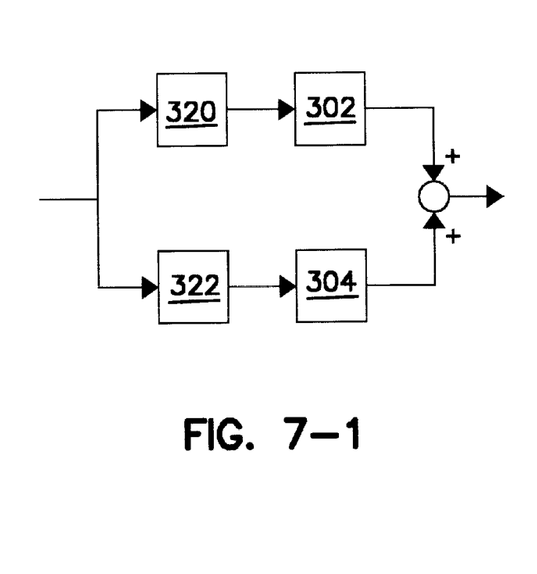
Figure 72:
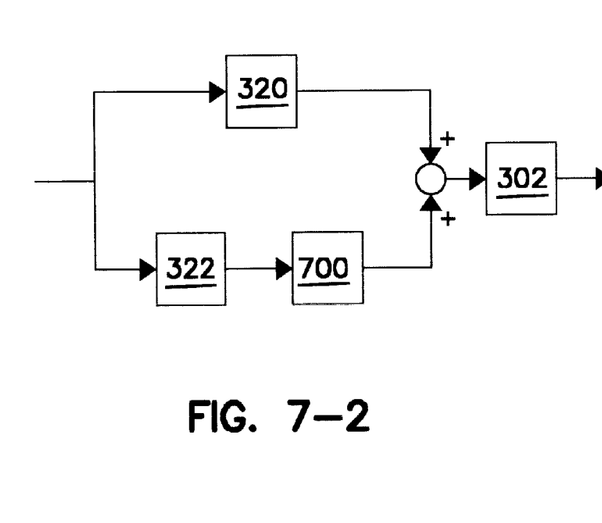

Referring now to FIGS. 6-1 to 6-3, implementation results with the above micro-actuator using parameter values of Table 2 are shown. The vertical axes in FIGS. 6-1 to 6-3 indicate amplitude in volts and the horizontal axes indicate time in ms. FIG. 6-1 shows PES and micro-actuator input signals when dual-stage servo system is in track following mode without RV disturbances. Trace 600 shows the PES, and trace 602 shows input voltage to the micro-actuator. Here, the peak—peak value of micro-actuator input is only 5.48V (+/−2.74V), which is lower than its saturation level. Therefore, the servo system does not saturate under these operating conditions.

FIG. 6-2 shows servo signals under 300 Hz 8.5 rad/s² RV disturbance in a prior art system without an anti-windup scheme. Under these conditions, micro-actuator input (trace 606) saturates at +/−4.5V due to large low frequency components and PES (trace 604) increases substantially. Thus, the closed-loop system becomes unstable. FIG. 6-3 shows tracking performance under conditions of FIG. 6-2 but with the anti-windup scheme of the present invention employed. The peak to peak voltage of the micro-actuator input is held within 7.96V (+/−3.98V) by the anti-windup system. Thus, satisfactory tracking performance is achieved during micro-actuator saturation.

Referring now to FIG. 7-1, a portion of servo loop 300 (of FIG. 3) is shown. FIG. 7-2 shows a simplified embodiment of the present invention that approximates controllers C1 (302) and C2 (304) of FIG. 7-1. Since the frequency responses of the servo circuits Lvcm_C1 and Lvcm_C2 (shown in FIGS. 5-1 and 5-2) are different only at low frequencies, C1 and C2 may be approximated by a second order compensator, Ca, shown as block 700 in FIG. 7-2. Thus, the servo circuit of FIG. 7-2 includes only one controller C1 (302) and second order compensator Ca. This servo circuit functions in a manner substantially similar to the servo circuit of FIG. 7-1, but is simpler to implement and requires less computation.

In summary, a servo loop embodiment for a disc drive (such as 100) for positioning a head (such as 110) over a disc (such as 106) while maintaining servo loop stability is provided. The servo loop (such as 300) includes an actuator-head assembly (such as 310) having a large-scale actuator (such as 218) and a micro-actuator (such as 220) that are both able to move the head (such as 110). The head (such as 110) generates a position value (such as 206) based on the head's location over the disc.

A micro-actuator controller (such as 306) generates a micro-actuator control value (such as 404) for driving the micro-actuator (such as 220) based on a position error value (such as 208). A saturation adjustment component (such as 312) coupled to micro-actuator controller 306 generates a saturation error value (such as 317) based on the micro-actuator control value (such as 404). An adaptive anti-windup circuit (such as 318, 320, 322 and 324) coupled to the saturation adjustment component (such as 312) then transfers control to the large-scale actuator (such as 218) when a saturation error value (such as 317) is generated by the saturation adjustment component (such as 312).

A method embodiment that maintains stability in a servo loop of a disc drive (such as 100), having a large-scale actuator (such as 218), a micro-actuator (such as 220), a head (such as 110), and a disc (such as 106) is provided. The method includes generating a position value (such as 206) based on the position of the head (such as 110) over the disc (such as 106). A micro-actuator control value (such as 404) is then generated for driving micro-actuator (such as 220). A saturation error value (such as 317) is generated based on the micro-actuator control value (such as 404) exceeds a threshold saturation value (such as 414). Control is transferred to the large-scale actuator (such as 218) when the saturation error value (such as 317) is generated.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to an adaptive anti-windup scheme for a disc drive storage system, it will be appreciated by those skilled in the art that the teachings of the present invention can be applied to other control systems, without departing from the scope and spirit of the present invention.

What is claimed is:

1. A servo loop in a disc drive for positioning a head over a disc while maintaining servo loop stability, the servo loop comprising:

an actuator-head assembly comprising the head, a large-scale actuator, and a micro-actuator, both the large-scale actuator and the micro-actuator configured to move the head over the disc, and the head configured to generate a position value based on its location over the disc;

a micro-actuator controller configured to generate a micro-actuator control value to control the micro-actuator based on a position error value;

a saturation adjustment component coupled to the micro actuator controller and configured to generate a saturation error value based on the micro-actuator control value; and an adaptive anti-windup circuit coupled to the saturation adjustment component and configured to transfer control to the large-scale actuator in response to the saturation error value generated by the saturation adjustment component.

2. The servo loop of claim 1, wherein the saturation adjustment component comprises a saturation operator that receives the micro-actuator control value and responsively provides a saturation control value.

3. The servo loop of claim 2, wherein the saturation adjustment component further comprises a difference node that receives the micro-actuator control value and the saturation control value and responsively produces the saturation error value.

4. The servo loop of claim 1, wherein the saturation error value is based on an amount by which the micro-actuator control value exceeds a threshold saturation value.

5. The servo loop of claim 4, wherein the threshold saturation value is two thirds of a micro-actuator saturation value.

6. The servo loop of claim 1, wherein the adaptive anti-windup circuit includes an adaptive gain component configured to adjust a control gain associated with each servo circuit of a plurality of servo circuits in the servo loop.

7. The servo loop of claim 1, wherein the adaptive anti-windup circuit comprises at least one anti-windup controller in one of a plurality of servo circuits, and wherein the anti-windup controller is configured to control the large-scale actuator when the saturation error value is generated by the saturation adjustment component.

8. The servo loop of claim 1, wherein the adaptive anti-windup circuit includes a second order compensator in one of a plurality of servo circuits.

9. A method of maintaining stability in a servo loop of a disc drive having a large-scale actuator, a micro-actuator, a head, and a disc, the method comprising:

(a) generating a position value based on the position of the head over the disc;

(b) generating a micro-actuator control value for driving the micro-actuator based on a position error value;

(c) generating a saturation error value based on the amount by which the micro-actuator control value exceeds a threshold saturation value; and (d) transferring control to the large-scale actuator when the saturation error value is generated according to step (c).

10. The method of claim 9, wherein the generating a saturation error value step (c) comprises:

(c)(1) generating a saturation control value from the micro-actuator control value generated in step (c); and (c)(2) combining the saturation control value generated in step (c)(1) with the micro-actuator control value generated in step (c) at a difference node to produce the saturation error value.

11. The method of claim 9, wherein the generating a saturation error value step (c) is carried out by a saturation adjustment component.

12. The method of claim 9, wherein the transferring control to the large-scale actuator step (d) includes adjusting a control gain of each servo circuit of a plurality of servo circuits in the servo loop.

13. The method of claim 9, wherein the transferring control to the large-scale actuator step (d) is carried out by an adaptive anti-windup circuit.

14. A disc drive implementing the method of claim 9.

15. A disc drive for storing information on a disc, the disc drive comprising:

an actuator-head assembly comprising a head, a large-scale actuator, and a micro-actuator, both the large-scale actuator and the micro-actuator configured to move the head over the disc; and an adaptive anti-windup means configured to reduce windup due to micro-actuator saturation.

16. The disc drive of claim 15 further comprising a micro-actuator controller configured to generate a micro-actuator control value to control the micro-actuator based on a position error value.

17. The disc drive of claim 16 wherein the adaptive anti-windup means comprising:

a saturation adjustment component coupled to the micro actuator controller and configured to generate a saturation error value based on the micro-actuator control value; and an adaptive anti-windup circuit coupled to the saturation adjustment component and configured to transfer control to the large-scale actuator in response to the saturation error value generated by the saturation adjustment component.

18. The disc drive of claim 17 wherein the saturation adjustment component comprises a saturation operator that receives the micro-actuator control value and responsively provides a saturation control value.

19. The servo loop of claim 18, wherein the saturation adjustment component further comprises a difference node that receives the micro-actuator control value and the saturation control value and responsively produces the saturation error value.

20. The servo loop of claim 17, wherein the saturation error value is based on an amount by which the micro-actuator control value exceeds a threshold saturation value.

21. The servo loop of claim 20, wherein the threshold saturation value is two thirds of a micro-actuator saturation value.

22. The servo loop of claim 17, wherein the adaptive anti-windup circuit includes an adaptive gain component configured to adjust a control gain associated with each servo circuit of a plurality of servo circuits in the servo loop.

23. The servo loop of claim 17, wherein the adaptive anti-windup circuit comprises at least one anti-windup controller in one of a plurality of servo circuits, and wherein the anti-windup controller is configured to control the large-scale actuator when the saturation error value is generated by the saturation adjustment component.

24. The servo loop of claim 17, wherein the adaptive anti-windup circuit includes a second order compensator in one of a plurality of servo circuits.

* * * * *